United States Patent [19]

Peck

[11] Patent Number: 5,020,604
[45] Date of Patent: Jun. 4, 1991

[54] DUAL TILLAGE IMPLEMENT

[75] Inventor: Donald R. Peck, Clive, Iowa

[73] Assignee: Deere & Company, Moline, Ill.

[21] Appl. No.: 471,293

[22] Filed: Jan. 26, 1990

[51] Int. Cl.$^5$ ............................................. A01B 21/04
[52] U.S. Cl. .................................... 172/177; 172/310;
172/551; 172/657; 172/556; 111/118
[58] Field of Search ................ 111/118, 130; 172/140,
172/142, 145, 148, 149, 174, 175, 177, 187, 310,
311, 532, 540, 551, 556, 572, 657, 573, 574, 620,
623, 624, 196, 197, 195; 301/111, 114, 105 R,
131, 132

[56] References Cited

U.S. PATENT DOCUMENTS

| | | | |
|---|---|---|---|
| 2,881,848 | 4/1959 | Liston | 111/130 X |
| 3,397,748 | 8/1968 | Whitesides | 172/548 |
| 3,967,685 | 7/1976 | Siekmeier | 172/624 X |
| 4,023,507 | 5/1977 | van der Lely | 111/118 |
| 4,033,270 | 7/1977 | Bezzerides et al. | 111/6 |
| 4,121,871 | 10/1978 | Adams, Jr. | 301/131 X |
| 4,231,305 | 11/1980 | van der Lely | 172/177 X |
| 4,231,433 | 11/1980 | Whitfield et al. | 172/662 |
| 4,415,041 | 11/1983 | Fackler | 172/551 |
| 4,646,850 | 3/1987 | Brown et al. | 172/551 |
| 4,817,732 | 4/1989 | Brown | 172/548 |

FOREIGN PATENT DOCUMENTS 1061715 12/1983 U.S.S.R. .............................. 172/540

OTHER PUBLICATIONS

Triple K, brochure by Kongskilde, "SBC Cultivating System", Jan. 1979.
"Pesticide Incorporation Distribution of Dye by Tillage Implements", article, Published by The North Carolina Agricultural Extension Service, 5/81/10M, AG-250.
Quinstar * Fallow-Master brochure.

Primary Examiner—Randolph A. Reese
Assistant Examiner—Jeffrey L. Thompson

[57] ABSTRACT

A combination tillage and incorporating implement having widely spaced sweeps in several rows at the forward portion of the main frame with tow trailing rows of angled spider wheels supported in pairs, for ground contour following ability and ease and flexibility of manufacture, by rockable arms extending rearwardly from the frame. Spray nozzles or the like, positioned rearwardly of the sweeps and forwardly of the spider wheels, apply material to the soil loosened and leveled by the sweeps to eliminate banding and uneven application otherwise causded by sweeps parting the soil or by material being deposited on rough ground surfaces. The rotational axes of the wheels of each row are parallel and angled with respect to the transverse direction with the rear row of wheels being angled in the opposite direction to that of the leading row to provide aggressive mixing and smooth uninterrupted soil flow across the width of the implement.

20 Claims, 3 Drawing Sheets

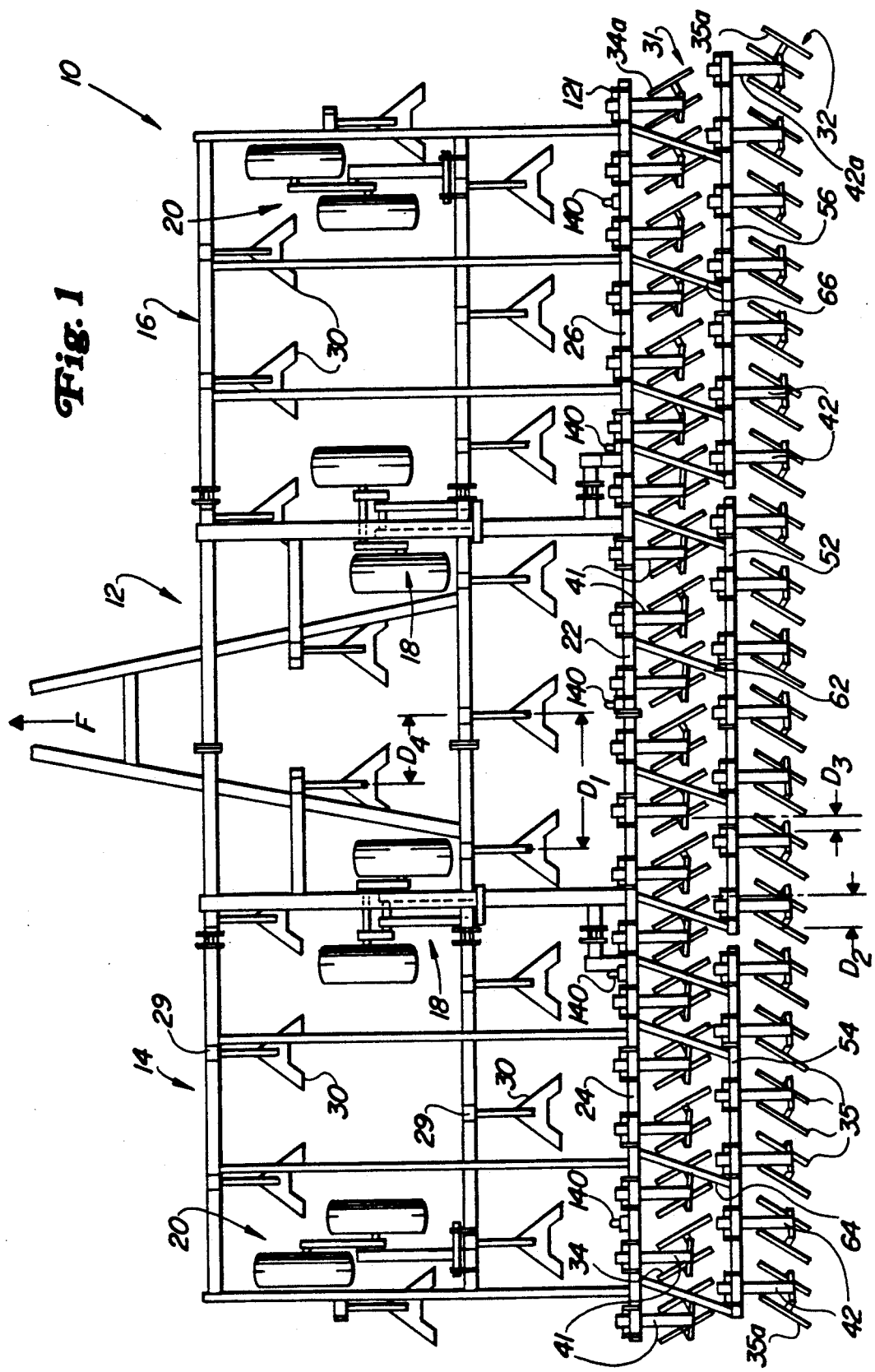

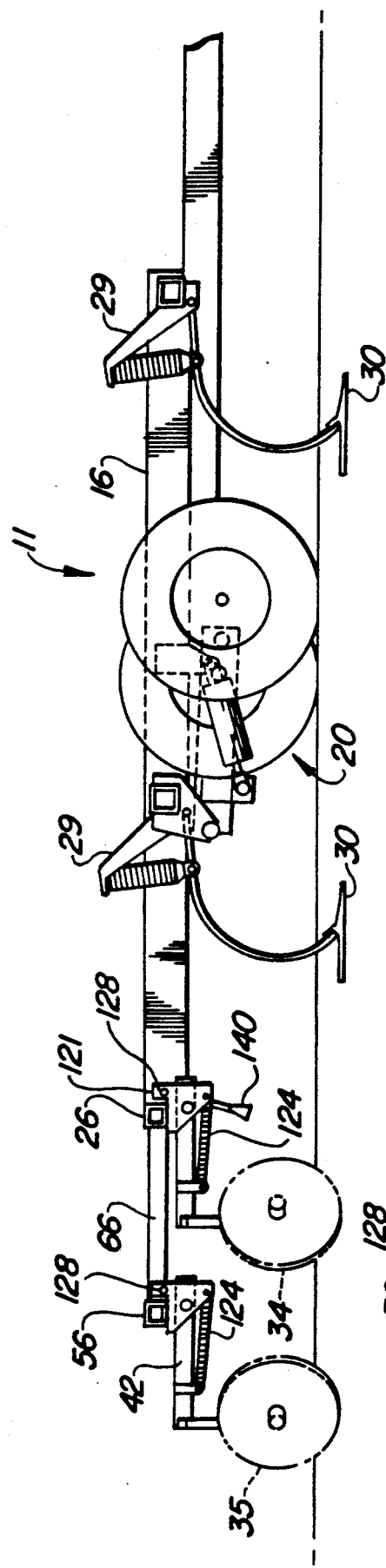

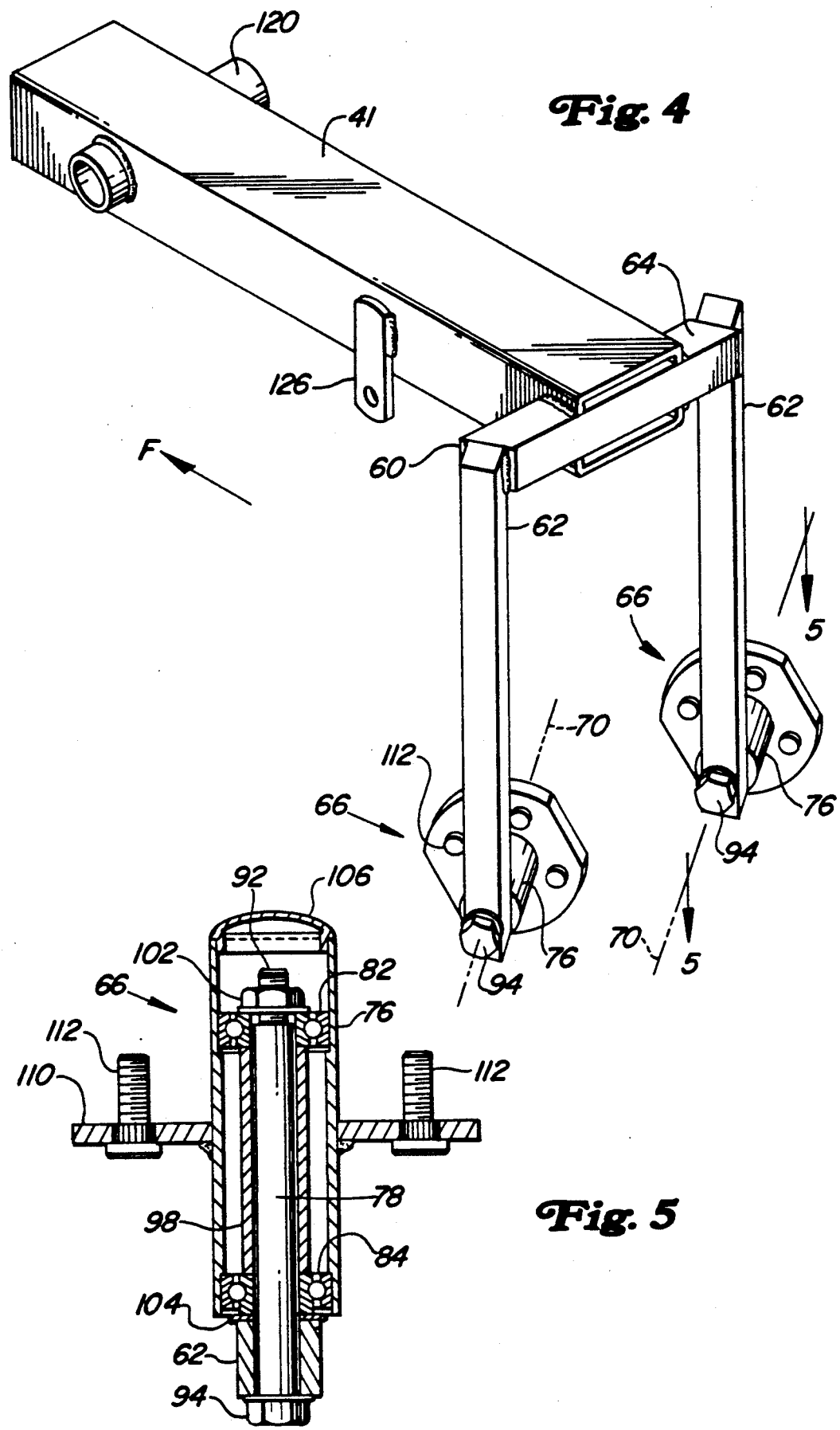

DUAL TILLAGE IMPLEMENT

BACKGROUND OF THE INVENTION

(1) Field of the Invention

The present invention relates generally to tillage equipment and more specifically to a dual function tillage and incorporation implement and an incorporator wheel support arrangement therefor.

(2) Related Art

Various combinations of cultivators, disks or chisel plows with a finishing or incorporating tool such as a harrow or rolling basket are available for preparing a seed bed for planting and incorporating chemicals into the soil. Although such implements are widely used in farming, many have one or more disadvantages such as a less than desirable chemical incorporation characteristic which can result in chemical streaking or banding or require a second pass through the field with the implement. Most incorporating implements are not sufficiently aggressive to bring up buried trash and increase ground cover for conservation tillage practices.

When a disk type of implement is used for incorporating, recommended procedures often include setting disk depth to twice the desired depth that incorporation is to take place, which results in heavy draft loads and increased chemical requirements. For example, if good incorporating to a two inch depth is required, the disk is typically set to a four inch depth, and chemical streaking is common at lower depths between two and four inches. Because some of the chemical gets below the desired level, the rate of application of the chemical has to be increased over what otherwise would be necessary if incorporation occurred only to the desired depth.

Spray nozzles are conventionally positioned near the front of the implement so that the chemical is mixed and spread by the tools. However, the spreading action of sweeps or similar tools can actually increases problems of banding and uneven chemical coverage as the tools bulldoze through the soil leaving a path with no chemical. In addition, the soil often is rough and includes ridges and the like so that the surface being sprayed is relatively uneven resulting in uneven spray patterns.

Bulldozing and streaking problems increase as the speed of the implement is increased thereby limiting the productivity of the implement. For example, the maximum speed of a disk or field cultivator, if not already limited by the extra draft of the deep penetration necessary for good incorporation to the desired level, is usually limited to six or seven miles per hour. An ideal range of incorporating speeds, however, includes an upper speed of around nine miles per hour.

Implements which include conventional field cultivator, chisel plow or disk sections often plug easily in wet and/or trashy conditions. Some dual function implements are relatively large and bulky and are difficult to transport and require lift assist wheels or other special lift structure to raise the trailing implements for transport. When the trailing implements are supported to facilitate vertical rocking in the ground-working position, instability during transport can be a problem. Wide gangs of incorporating or tillage tools on some implements reduce the number of possible implement width combinations that can be fabricated without nonconventional gang widths, thereby adding to manufacturing costs for implements with certain preselected widths.

Machines which use spider wheels mounted in gangs have trouble mixing soil and material to be incorporated since the wheels are typically arranged in gangs of six or more wheels and are supported by the top of ridges so the wheels do not mix the soil and material in the bottom of the valleys. Usually there is only one rank of wheels, and the wheels cannot be spaced close enough to each other for proper mixing action. The nonuniform soil flow created from the end of one gang of wheels to the beginning of the next causes an uneven soil surface profile, and the wheels leave furrows at the machine edges. The wheels also are not very aggressive and do not move much soil or lift much buried trash for conservation tillage.

Implements such as shown in U.S. Pat. No. 4,646,850 have been proposed which utilize rows of large diameter spider wheels, such as shown in U.S. Pat. No. 4,817,732, rotated in the soil about axes offset from the transverse direction to provide good incorporation and a smooth seed bed on previously tilled soil. Although providing good results, use of these implements usually requires a prior pass of a tillage implement such as a field cultivator or chisel plow to loosen the soil, cut the roots of existing plant growth and level the soil. Supporting the large wheels at an angle from the fore-and-aft direction while protecting the wheel bearings from damage has been a continuing problem.

BRIEF SUMMARY OF THE INVENTION

It is therefore an object of the invention to provide an improved dual tillage implement. It is a further object to provide an improved rotary incorporator wheel support for such an implement. It is yet another object to provide such structure which overcomes the aforementioned problems.

It is a further object of the present invention to provide a dual tillage implement with an improved incorporator/leveling section which facilitates single pass tillage and incorporation/leveling at reduced drawbar loads. It is still a further object to provide such a dual tillage implement which eliminates spreading of chemical by the forwardmost tools and advantageously utilizes the leveling action of the forwardmost tools to provide more uniform incorporation. It is another object to provide such an implement which is capable of effective incorporating at higher speeds than heretofore realizable with most existing incorporating implements.

It is a further object of the invention to provide an improved combination tillage and incorporation implement which incorporates only to the required depth of incorporation so that chemical requirements are minimized and draft loads are reduced over conventional incorporating equipment. It is another object to provide such an implement wherein the depth of incorporation is determined substantially by the depth of penetration of a forward tillage portion of the implement.

It is yet another object of the present invention to provide an improved support arrangement for the incorporator wheels on a dual tillage implement. It is a further object to provide such a support arrangement which includes an improved bearing arrangement for incorporator wheels with axes of rotation which are angled from the transverse direction. It is another object to provide such a bearing arrangement which is sealed at its leading end and protected at its trailing end from harmful dirt and debris.

It is another object to provide such an incorporating implement having improved frame structure which is sturdy, compact and more easily transported than at least most previously available incorporating implements. It is yet another object to provide such an implement wherein a relatively large number of width combinations is possible utilizing a relatively small number of standard components.

An implement constructed in accordance with the teachings of the present invention includes a frame adapted for forward movement over a field and supporting two rows of forward tillage tools such as chisel plow shanks and two in-line rows of large, aggressive rear spider wheels having rotational axes offset at an acute angle to the direction transverse to the forward direction. The wheels are mounted in pairs on the aft end of a rockable support arms for good contour following ability.

First and second bearing assemblies are fixed to lower ends on the legs of a U-shaped support which is connected to the support arm. The bearing assemblies project forwardly and in the same transverse direction from the respective support ends to define the offset rotational axes. An incorporator wheel is rotatably connected to each of the bearing assemblies, with the forwardly projecting ends of the bearing assemblies supporting bearing cap structure for sealing the bearing assemblies from dirt and debris at the leading face of the angled spider wheels. The trailing ends of the bearings are located generally behind their respective wheels and so are protected from a substantial portion of the dirt and debris. The bearing assemblies include a cylindrical hub portion having leading and trailing ends, a forward bearing seated within the hub portion and offset rearwardly of the leading end, and a rear bearing seated in the trailing end. A bolt extends through the bearings and is fixed to the respective leg end.

The implement frame includes a rearward transverse beam supporting a plurality of the support arms in transversely spaced relation behind widely spaced forward sweeps. A parallel rearmost support beam is fixed to the rearward transverse beam above and behind the rotary incorporator wheels associated with the first row of support arms. A second plurality of support arms is carried on the rearward transverse beam and spaced in the transverse direction generally between the support arms on the rearmost support beam to define the two fore-and-aft spaced rows of rotary incorporator wheels. The rotational axes of the rotary incorporator wheels on the forwardmost row of wheels are angled from the transverse direction in the opposite direction as the wheels on the rearwardmost row to provide uniform soil flow over the entire width of the machine. The soil is first moved in one direction by the leading wheels. After the soil settles, it is moved back to the original area by the trailing wheels to provide excellent mixing action. The wheel layout provides an effective wheel spacing which is a fraction (preferably one-fourth) of the effective forward sweep spacing for good incorporating action, trash shedding capability and manufacturing flexibility. The aggressive wheel action causes soil and plant material to become airborne, with the lighter plant material falling in place last for higher trash cover and therefore better erosion control. The sweeps are widely spaced for accommodating heavy trash.

Spray nozzles are supported from the frame at locations behind the sweeps and ahead of the wheels to eliminate chemical spreading by the sweeps and to take advantage of the leveling action of the sweeps for more uniform application of the chemical. The sweeps cut roots and establish the incorporation depth without having to operate at a depth substantially lower than the incorporation depth so that less power is required to pull the implement and more effective use of the chemical is realized. The implement provides good tillage and incorporating/leveling results with a single pass. The frame structure is stable, compact and sturdy, and no additional lift assist wheels or other lift structure is required to raise and support the implement for transport.

These and other objects, features and advantages of the present invention will become apparent to one skilled in the art upon reading the following detailed description in view of the drawings.

BRIEF DESCRIPTION OF THE DRAWINGS

FIG. 1 is a plan view of a dual tillage implement with forward shovels and rear leveling/incorporating wheels.

FIG. 2 is a side view of the implement of FIG. 1 in the field-working position.

FIG. 3 is a view similar to FIG. 2 but showing the implement raised to the transport position.

FIG. 4 is a perspective view of the incorporator wheel support assembly for the implement of FIG. 1.

FIG. 5 is an enlarged cross-sectional view of the bearing assembly utilized in the support assembly of FIG. 4.

DETAILED DESCRIPTION OF THE DRAWINGS

Referring now to FIG. 1, therein is shown a dual tillage implement 10 having a frame 11 which includes a main center frame 12 and outrigger frames 14 and 16 pivotally connected to the center frame 12. Main and outrigger depth control and implement lift wheel assemblies 18 and 20 are connected to the respective frames 12 and 14, 16.

The frames 12, 14 and 16 include rearward transverse beams 22, 24 and 26, respectively, which are part of box frame arrangement. Several ranks of shanks 29 with tillage tools such as chisel plow shovels 30 are connected to transverse members of the frames forwardly of the rear beams 22, 24 and 26 to loosen the soil, dislodge plant growth and level ridges and other irregularities in the ground surface. First and second rows 31 and 32 of rotary incorporator wheels 34 and 35 are supported from and immediately behind the rear beams 22, 24 and 26 for rotation about axes which form an acute angle with respect to the direction transverse to the forward direction of travel F of the implement 10. The wheels 34 and 35 are preferably large spider wheels of the type shown and described in the aforementioned U.S. Pat. No. 4,646,850, and the axes of rotation of the forward row 31 of wheels 34 are parallel to each other so the offset of the wheels is the same for the entire row. Likewise the rear row 32 of wheels 35 have parallel and offset axes, but the axes are offset in the opposite direction. As can best be appreciated from FIG. 1, the wheels in each row are generally aligned across the width of the entire frame in a substantially uniform and uninterrupted pattern for providing a continuous dirt flow pattern across the width of the frame 11. The soil is moved first to the right by the forward row 31 and then back to the left toward the original location by the trailing row 32.

To provide aggressive wheel action, the wheel axis angle is set within a range of twenty to forty degrees from the transverse direction, with the pitch of the wheel tines at an additional angle of approximately thirty degrees. A wheel axis angle of about thirty degrees is preferred with the centers of the wheels 35 in the rear row 32 located between the corresponding wheel centers of the wheels 34 in the row 31 so that the wheels 34 and 35 leave a generally uniform depth of penetration profile in the soil. The working depth of each wheel, substantially determined by the working depth of the sweeps 30, only has to be slightly below the desired depth of good incorporation so drawbar loading is minimized.

The rearward beams 22, 24 and 26, which are aligned in the transverse direction when the implement 10 is in the unfolded position shown in FIG. 1, support a plurality of fore-and-aft extending support arms 41 and 42 in transversely spaced parallel relation behind the sweeps 30. Rearmost support beams 52, 54 and 56 are fixed in cantilever fashion to the respective rear transverse beams 22, 24 and 26 by diagonal braces 62, 64 and 66 above the rotary incorporator wheels 34 associated with the first row of support arms 41. The support arms 42 are carried on the beams 52, 54 and 56 and are spaced in the transverse direction generally between the support arms 41 (FIG. 1).

A downwardly opening, U-shaped weldment 60 (FIG. 4) with side legs 62 and upper cross member 64 is fixed to the aft end of each of the arms 41, 42. The side legs 62 are angled with respect to the forward direction F at the desired wheel angle which is preferably about thirty degrees. Bearing and hub assemblies 66 are secured to the lower ends of the side legs 62 to define wheel axes 70 which are generally horizontal. Only the right-hand (the designation determined by the direction of soil throw) assembly is shown in FIG. 4, but it is to be understood the left-hand assembly is similarly constructed and generally the mirror image of the right-hand assembly.

The bearing and hub assemblies 66 (FIGS. 4 and 5) include a cylindrical hub portion 76 rotatably mounted on the shaft of a mounting bolt 78 by a forward ball bearing 82 and a rear ball bearing 84. Threaded end 92 of the bolt 78 extends through the forward bearing 82, and head end 94 of the bolt 78 abuts against the aft angled face of the leg 62. A spacer 98 is located between the inner races of the bearings 82 and 84, and a nut and washer 102 is threaded onto the end 92 to secure the bearing and hub assembly 66 in position on the leg 62. A washer 104 is secured between the inner race of the bearing 84 and the forward angled face of the leg 62. The end 92 and forward bearing 82 are completely contained within the forward end of the hub portion 76 and are sealed by an end cap 106 to protect the assembly from dirt and debris at the leading face of the angled wheel 34. A Wheel hub 110 with studs 112 is fixed to the central portion of the hub portion 76 between the bearings 82 and 84 to receive the incorporator wheel which is secured to the hub by nuts (not shown) threaded onto the studs To provide free rotation, the aft bearing 84 remains uncapped but is protected from the brunt of dirt and debris by the wheel 34. A multi-lipped seal (not shown) on the aft bearing prevents foreign matter from entering the bearing. The cap 106 protects the threaded end 92 of the bolt 78 as well as the bearing 82 and facilitates easy assembly and disassembly of the hub 66.

A pivot bearing 120 is located at the forward end of the arm 41 and is connected by a bracket 121 (FIGS. 2 and 3) to the rear beam 26 for rocking vertically so that the two Wheels 34 associated therewith can follow ground contours easily. A down pressure spring 124 is stretched between the lower portion of the bracket 121 and a rear, downwardly projecting tab 126 fixed to the arm 41. The bracket 121 includes a downstop pin 128 for limiting downward rocking of the arm 41 to the position shown in FIG. 3 for good transport ground clearance. The downstop pin 128 is removable so that the arm 41 can be rotated to attach the spring 124 in the relaxed condition. Sufficient preload, preferably around five hundred pounds, is provided to maintain the incorporator wheels at the desired incorporation depth, even over rough surfaces, without digging beyond a depth determined substantially by the depth of penetration of the shovels 30. When the implement is in the transport position, the preload of the springs 124 maintains the arms against the transport stop.

Spray nozzles 140 (FIGS. 1 and 2) or other material distributing devices are spaced across the width of the frame 11 adjacent the beams 22, 24 and 26 for applying chemicals or other materials uniformly across the width on the soil loosened and leveled by the sweeps 30. The soil and material to be incorporated is moved to the right and mixed by the first row 31 of the wheels 34. Sufficient spacing is provided between the rows 31 and 32 so that the soil first settles before being moved back toward the original location by the rear wheels 35. The aggressive action of the angled wheels 34 and 35 lifts trash which settles after the soil and incorporated material for advantageous trash cover which helps prevent erosion.

As seen in FIG. 1, the sweeps 30 are generally supported in two rows 151 and 152 with the sweeps in each row widely spaced apart a distance D1 (where D1 is slightly less than the working width of the shovel) to provide good trash flow capabilities. The spacing between incorporator wheels 34 or 35 in rows 31 or 32 is D2, wherein D2 is preferably one-fourth the distance D1. The effective transverse spacing of the wheels 34 and 35 (D3) is one-half D2, and the effective transverse spacing of the shovels D4 is one-half D1. Therefore, the machine has four wheels for each shovel 30, and numerous machine width combinations, preferably in increments of width D1, can be manufactured easily and economically. With a sweep width of twenty-four inches, D1 is selected to be forty inches so that D2 is ten inches, D3 is five inches and D4 is twenty inches.

To feather the soil at the ends of the implement 10 for a smoother bed and better incorporation pattern, the rightmost wheels 34a and 35a in the rows 31 and 32 are smaller in diameter than the inner wheels. The arm 42a supports the smaller wheel 35a from the right leg 62 opposite the conventional wheel 35 (FIG. 1), outwardly of the wheel 34a. On the left side of the machine, a smaller wheel 35a is supported at the outermost position in the rear row 32 to reduce soil throw toward the left at the edge of the machine. In the preferred embodiment, the wheels 34 and 35 have a diameter of approximately twenty inches, while the wheels 34a and 35a have a diameter of approximately eighteen inches. The pattern of elements on the implement facilitate ground speeds of up to approximately nine miles per hour.

Having described the preferred embodiment, it will become apparent that various modifications can be made without departing from the scope of the invention as defined in the accompanying claims.

I claim:

1. A tillage implement having a frame adapted for forward movement over a field and including spider wheels adapted for forward movement over the ground, wherein the spider wheels have rotational axes offset at an acute angle to the direction transverse to the forward direction to generally define leading and trailing faces, the implement comprising:

a spider wheel support comprising a support arm having a forward end pivotally connected to the frame for rocking about a generally transverse axis; first and second upright arms fixed at their upper ends to the aft end of the support arm and extending downwardly therefrom to lower spider wheel support ends; first and second bearing assemblies fixed to the support ends of the first and second upright arms, respectively, the bearing assemblies projecting forwardly and in the same transverse direction from the respective support ends to define said rotational axes, and a rotary incorporator spider wheel connected to each of the bearing assemblies for rotation about the axes;

wherein the implement frame includes a rearward transverse beam supporting a plurality of the support arms in transversely spaced relation and a parallel rearmost support beam fixed to the rearward transverse beam above and behind the rotary incorporator spider wheels associated with said plurality of support arms; and a second plurality of support arms carried on the rearmost transverse beam and spaced in the transverse direction generally between the support arms on the rearward support beam; and wherein two front and rear spaced rows of rotary incorporator spider wheels are defined which each extend the width of the implement, the wheels in each row being uniformly spaced parallel to each other and located in generally an uninterrupted pattern along a line extending in the transverse direction so that a continuous direct flow pattern is established by the wheels across the width of the implement.

2. The invention as set forth in claim 1 wherein the rotational axes of the rotary incorporator wheel in each of the row of spider wheels are generally parallel to each other and the axes of one of the rows are angled from the transverse direction in the opposite direction as the axes on the other of the rows so that dirt is moved in opposite directions by each row, and wherein the front and rear rows are spaced a substantial distance apart, with the forward extremities of the wheels of the rear row located a distance of at least half the preselected diameter from the rearward extremity of the wheels of the front row so that the soil lifted by the front row of wheels settles before being contacted by the rear row of wheels.

3. The invention as set forth in claim 1 wherein the implement frame includes transverse rows of tool-supporting shanks located forwardly of the wheels, wherein the spacing between adjacent spider wheels is a distance D2 and wherein the shanks in a row are spaced apart a distance D1, D1 being an integer multiple of D2.

4. The invention as set forth in claim 3 wherein the total number of wheels on the implement is at least approximately four times the number of shanks.

5. A combination tillage and incorporating implement including a fore-and-aft extending frame supported for forward movement over the ground, the implement comprising:

a plurality of spider wheels of preselected diameter, and means for supporting the spider wheels from the aft end of the frame in two front and rear rows spaced fore-and-aft of each other a distance at least approximately equal to one-half the preselected diameter, the wheels in each row being parallel to each other, uniformly spaced, and located in an uninterrupted pattern extending the width of the implement along a line transverse to the forward direction so that a continuous dirt flow pattern is established by the wheels in each row across the width of the implement;

a plurality of tillage tools supported from the frame forwardly of the spider wheels for loosening and leveling the ground prior to contact of the ground by the spider wheels; and means for dispensing material to be incorporated into the soil on the loosened and leveled soil across the width of the implement rearwardly of the tillage tools and forwardly of the spider wheels.

6. The invention as set forth in claim 5 wherein the axes of rotation of the front row of spider wheels are parallel and are angled in a first direction from the direction transverse to the forward direction and wherein the axes of the rear row of spider wheels are parallel, the spider wheels in the front row of wheels being offset a substantial distance n the fore-and-aft direction from the rear row of wheels, so that dirt from the flow of dirt from the front row settles before being moved by the rear row.

7. The invention as set forth in claim 6 wherein the axes of rotation of the rear row of spider wheels are angled from the transverse direction in a second direction opposite the first direction.

8. The invention as set forth in claim 7 wherein the tillage tools comprise at least two fore-and-aft spaced rows of sweeps.

9. The invention as set forth in claim 8 wherein the distance between the speeds in a row is at least D1 and the distance between wheels in a row is D2, with the distance D1 being at lest twice the distance D2.

10. The invention as set forth in claim 9 including a plurality of wheel supports, means for rockably connecting the wheel supports to the aft end of the frame for independent vertical rocking, each wheel support rotatably mounting at least one but no more than three spider wheels.

11. The invention as set forth in claim 10 wherein the wheels of the rear row are spaced, in the transverse direction, between the wheels of the front row, and wherein the overall effective transverse spacing D3 between the wheels is approximately one-fourth of the effective transverse spacing D4 of the sweeps.

12. The invention as set forth in claim 8 wherein the spacing between sweeps in a row is greater than the width of the sweeps for accommodating trash.

13. The invention as set forth in claim 7 wherein the axes of rotation of the wheels are angled in a range of from twenty to forty degrees from the direction transverse to the forward direction.

14. The invention as set forth in claim 5 further including means for maintaining the spider wheels at a depth of penetration substantially the same as the depth of penetration of the sweeps to thereby define a material incorporation depth approximately equal to the depth of penetration of the sweeps.

15. A combination tillage and incorporating implement including a fore-and-aft extending and generally rectangular frame supported for forward movement over the ground, the implement comprising:

means supporting front and rear fore-and-aft spaced rows of spider wheels of preselected diameter from the aft end of the frame with each row extending transversely to the forward direction and with the wheels in each row being generally uniformly spaced, aligned and parallel to each other across the width of the frame in a substantially uniform and uninterrupted pattern for providing a continuous dire flow pattern across the width of the frame, wherein the front and rear rows are spaced a substantial distance apart, with the forward extremities of the wheels of the rear row located a distance of at least approximately one-half the preselected diameter from the rearward extremity of the wheels of the front row so that soil lifted by the front row of wheels settles before being contacted by the rear row of wheels;

a plurality of sweeps; and means supporting the sweeps from the frame in at least two rows forwardly of the spider wheels for loosening and leveling the ground prior to contact of the ground by the spider wheels.

16. The invention as set forth in claim 15 including means for dispensing material to be incorporated into the soil substantially only on the loosened and leveled soil across the width of the implement rearwardly of the sweeps and forwardly of the spider wheels.

17. The invention as set forth in claim 16 wherein the rows of spider wheels include outermost wheels having an effective diameter less than the effective diameter of inwardly adjacent spider wheels to feather the soil and prevent streaking of the incorporated material adjacent the ends of the implement.

18. The invention as set forth in claim 15 wherein the wheels have axes of rotation at an acute angle to the direction transverse to the forward direction.

19. The invention as set forth in claim 15 wherein the sweeps each define an effective working width, and the means supporting the rows of spider wheels include means for supporting the wheels in groups for individual rocking of each group to follow ground contours, wherein the effective working width of each group is less than the sweep effective working width.

20. The invention as set forth in claim 15 including means for maintaining the depth of penetration of the spider wheels substantially the same as the depth of penetration of the sweeps.

* * * * *